April 20, 1937.  F. A. PARSONS  2,077,434
MACHINE TOOL
Filed Aug. 19, 1935  6 Sheets-Sheet 4

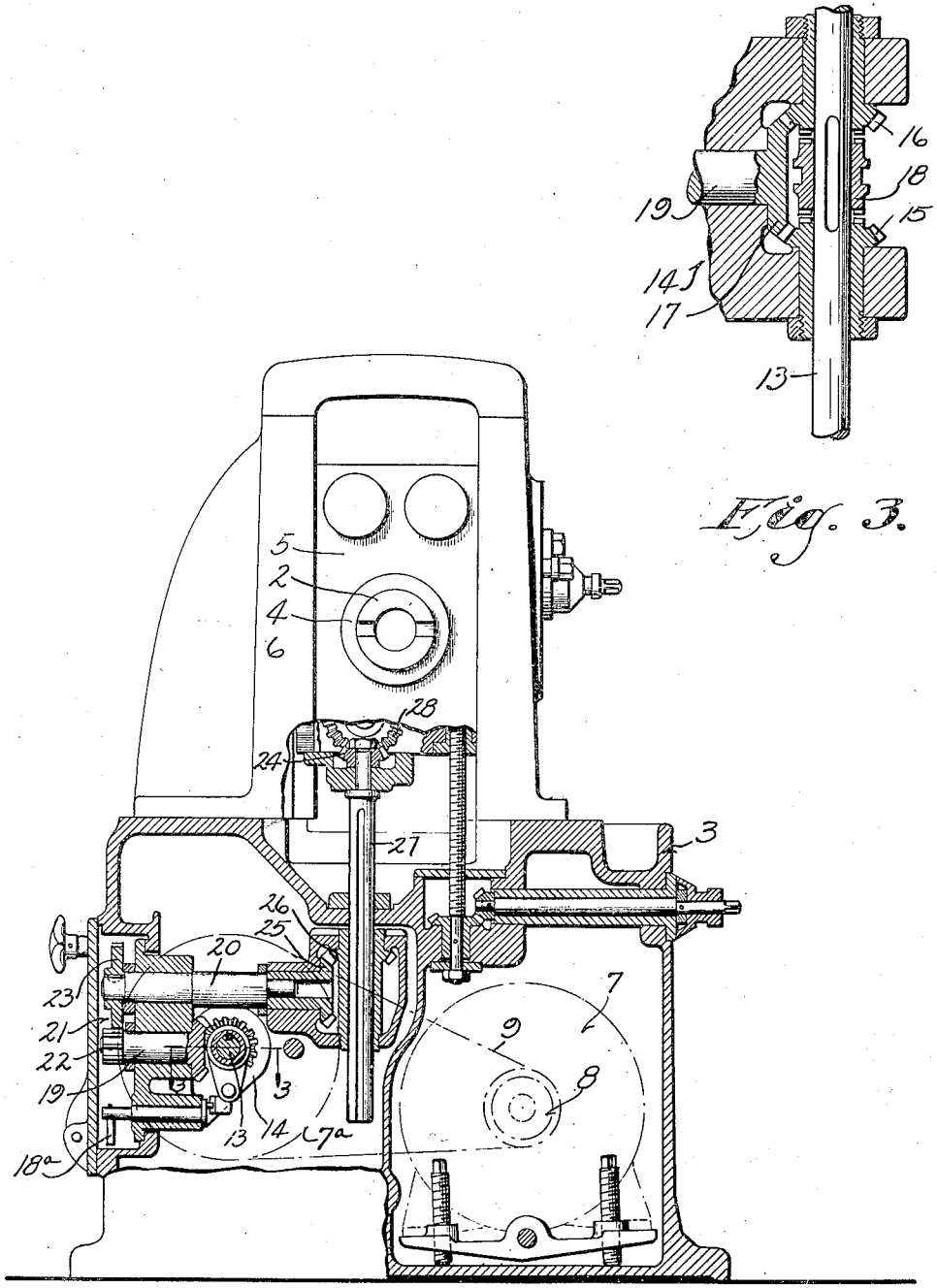

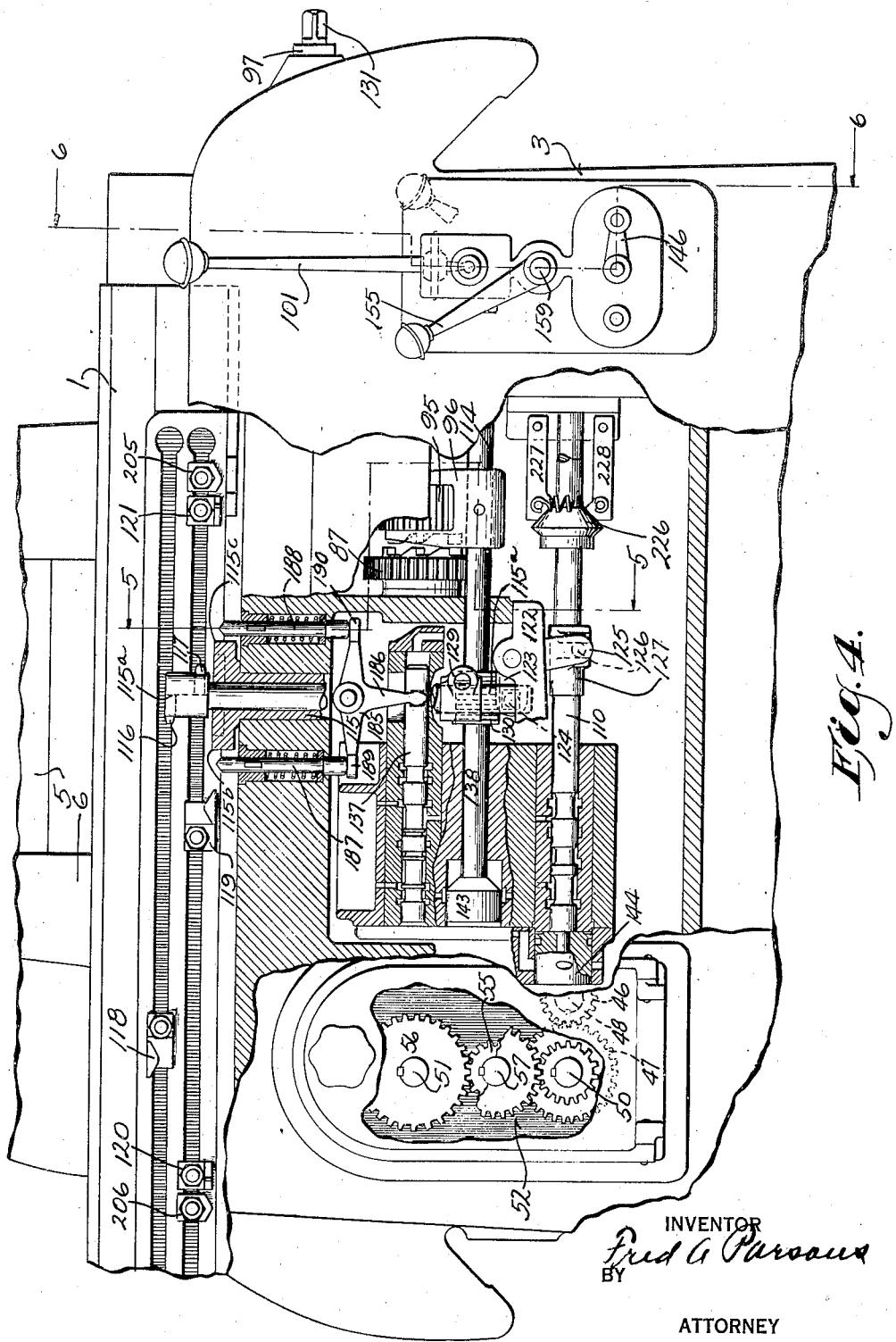

INVENTOR
Fred A. Parsons
BY
ATTORNEY

Patented Apr. 20, 1937

2,077,434

UNITED STATES PATENT OFFICE 2,077,434

MACHINE TOOL

Fred A. Parsons, Milwaukee, Wis., assignor to Kearney & Trecker Corporation, West Allis, Wis.

Application August 19, 1935, Serial No. 36,766

35 Claims. (Cl. 90—21)

This invention relates to machine tools and more particularly to a milling machine transmission and control mechanism.

An object of the invention is to provide an improved transmission mechanism and controls therefor which may be used for either hand or automatic operation of a machine tool, or for movements involving both hand and automatic control, and particularly for a milling machine.

A further object is to provide improved control mechanism for automatic reversal without use of lost motion mechanical snap over devices, to obtain certain advantages to be had in the absence of such devices, and to avoid certain objectionable features attendant upon the use of such devices.

A further purpose is to provide improved automatic reversing means, particularly as to a greater degree of accuracy in effecting reversal at a predetermined point of forward movement, and which operates substantially without variation in the point of reversal, irrespective of changes in the forward rate, and irrespective of variations in the forward load.

A further purpose is to provide an improved transmission for machine tools in which the direction and alternative feed or quick traverse rate are determined by separate and individually operable mechanisms, and to provide improved control means therefor in which the controls for direction and for alternative feed or quick traverse rate are independently operable, but the automatic control of direction is interrelated or interconnected with the control for alternative feed or quick traverse rate in such manner that, irrespective of whether the forward movement is at feed or quick traverse rate, the reverse movement invariably starts at quick traverse rate; and particularly for the control of milling machine tables.

A further purpose is to effect an improved control for the main clutch of a machine tool, and particularly for the spindle clutch in a milling machine, and to provide interconnection or inter-relation of the clutch control with other transmission and control mechanism of the machine, and especially where the direction and other controls are interconnected as indicated in the last preceding paragraph.

A further purpose is to provide an improved form of control mechanism at least in part hydraulically operated, particularly for some or all of the purposes herein mentioned, and especially where a part of the control mechanism of the machine is manually operated.

A further purpose is generally to simplify and improve the construction and operation of machine tools, and particularly of milling machines, and especially for one or more of the purposes previously mentioned and still other improvements and purposes will be apparent from the description and claims.

The invention consists in the construction and combination of parts as herein illustrated, described, and claimed, and in such modification of the structure illustrated and described as is equivalent to the structures of the claims.

Figure 2 is a front elevation of the same machine, partly in section taken approximately along line 2—2 of Fig. 1.

Figure 3 is a partial section taken along line 3—3 of Fig. 2 and enlarged.

Figure 4 is an enlarged partial front view of the same machine, and with portions of the supporting structure broken away to show some of the interior mechanism.

Like parts are identified by the same reference characters throughout.

Figure 1:
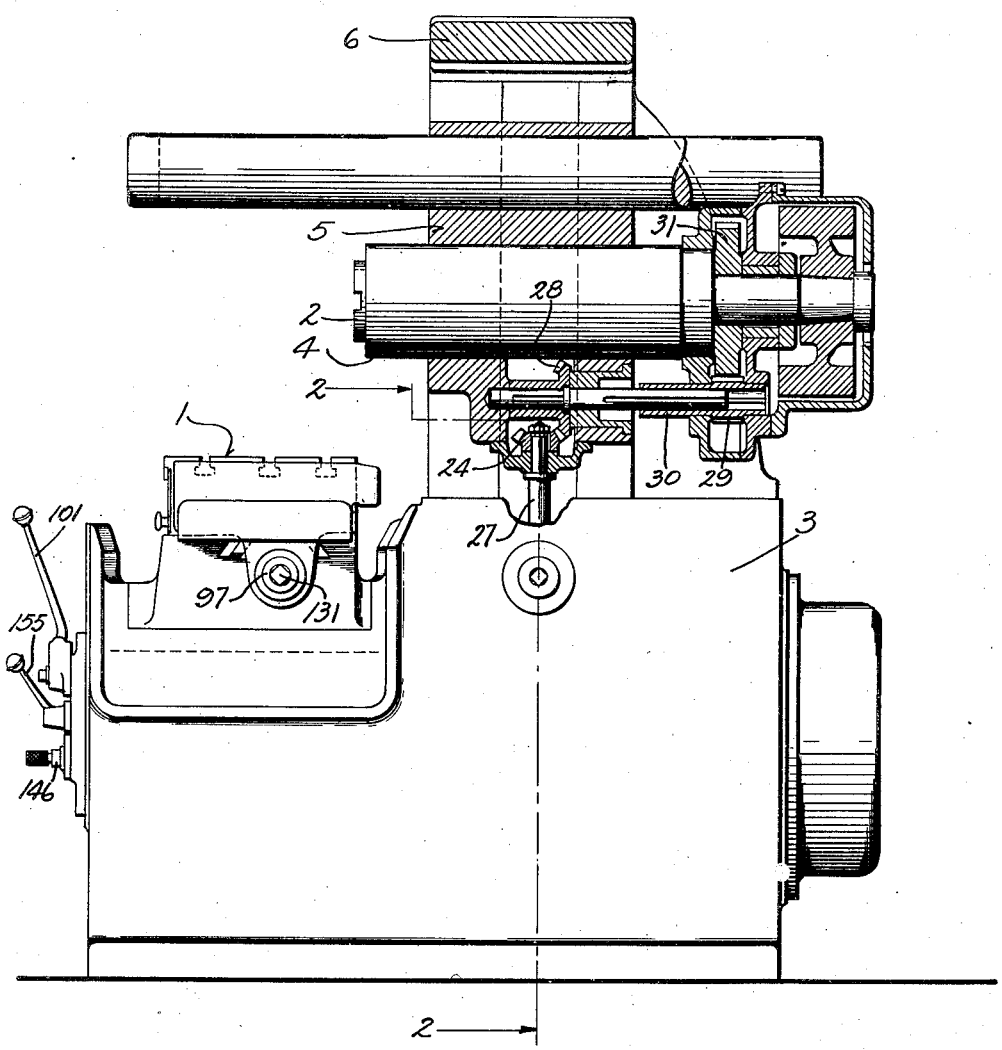
Figure 1 is a right side elevation, partly in section, of a milling machine incorporating the invention.

The machine here shown to illustrate the invention is a milling machine of the type having a fixed height reciprocatory work support or table 1 and a bodily vertically movable and rotatable tool spindle 2. A bed or base 3 supports spindle 2 and table 1, the spindle being journaled in a transversely movable quill member 4, which is guided in a vertically movable carrier member 5. Carrier 5 is guided in a supporting structure 6 in any suitable manner. Both members 4 and 5 may be adjusted and locked or clamped in various positions of their adjustment by any suitable adjusting and clamp means, not shown.

A transmission is provided for rotation of spindle 2, as follows: A motor 7, Fig. 2, is housed in base 3 and drives a pulley 7a through a pulley 8 and belt means 9. Pulley 7a is fixed at one end of a shaft member 10, Fig. 7, at the other end of which is fixed the driving element 11 of a multiple plate friction type main clutch generally denoted by the numeral 12. When clutch 12 is engaged a shaft 13 is driven from motor 7. At an intermediate point shaft 13 carries a spindle reverser generally denoted by numeral 14, Figs. 2, 3 which comprises bevel gears 15, 16, 17, and a clutch member 18 manually engageable by a hand lever 18a, Fig. 2, to drive gear 17 in either direction. The driven gear 17 is fixed on a shaft 19 and drives a shaft 20, Fig. 2 through a spindle rate changer generally denoted by the numeral 21 and comprising a plurality of sets of interchangeable and reversible gear pairs such as gears 22, 23. The shaft 20 drives a bevel gear 24, Figs. 1, 2, vertically movable with the spindle carrier 5, through bevel gears 25, 26 and a vertical spline shaft 27, the gear 25 being fixed on shaft 20, and gear 26 slidably keyed with shaft 27. A bevel gear 28, Fig. 1, meshes with gear 24 and drives a pinion 29 through an extensible coupling 30, the pinion 29 meshing with a gear 31 fixed on tool spindle 2.

Figure 7:
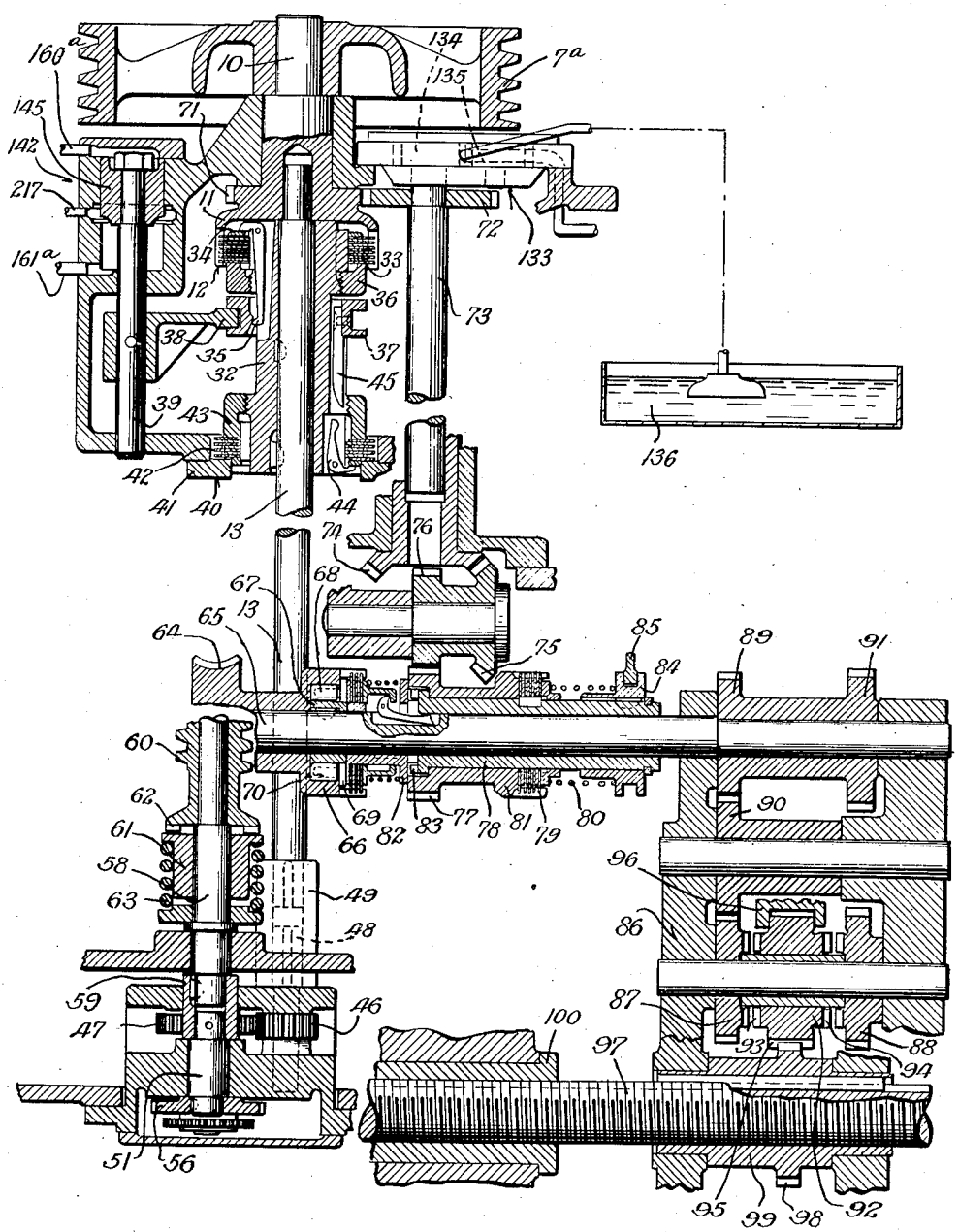
Figure 7 is a semi-diagrammatic development of certain transmission mechanism and some of the control mechanism of the machine.

The main clutch 12 includes driving member 11, Fig. 7, a driven member 32 fixed with shaft 13 and the friction plates 33 which are alternatively keyed with the driving and driven members and slidable into mutual friction engagement. An abutment plate 34 may be shifted by a lever 35 to force the friction plates together and against an abutment 36 which is adjustable on member 32 to compensate for wear. The lever 35 is operated from a clutch spool 37 to engage or to release clutch 12, the spool 37 being shiftable by the means of a fork or shifter 38 fixed on a shifter rod 39 which is selectively movable by means later described.

A brake, generally denoted by the numeral 40, Fig. 7, is operative on shaft 13 and on the transmission driven therethrough, in the clutch releasing position of the main clutch 12. Brake 40 comprises an abutment 41 fixed with bed 3, mutually engageable friction plates 42, an adjustable abutment 43 and a lever 44 which is shifted to engage the brake upon the clutch releasing movement of shifter spool 37, by the means of a member 45 fixed to move with the spool.

A feed rate train for table 3 is driven through main clutch 12 from shaft 13, which extends forward and drives a gear 46, Figs. 4, 7, meshing with a gear 47, the gear 46 being fixed on a shaft 48 coaxial with shaft 13 and driven therefrom through a splined coupling 49. Gear 47 is fixed on a shaft 50, Fig. 4, which drives a shaft 51, Figs. 4, 7, through a feed rate changer generally denoted by the numeral 52, Fig. 4, and comprising a plurality of interchangeable and reversible gear pairs such as gears 55, 56, the driving and driven gears being removably keyed with shafts 50 and 51 respectively, and the intermediate gears being each removably keyed on a shaft 57. Shaft 51 drives a coaxial shaft 58, Fig. 7 through a coupling member 59. A worm 60 is rotatably mounted on shaft 58, but is normally driven at shaft speed through an overload release device comprising a member 61 having angular faced end teeth pressed into engagement with complementary clutch teeth 62 on the end face of the worm. In the event of overload the member 61 is forced back against the resistance of a spring 63 to disengage the clutch teeth, engaging again as the load is reduced. Worm 60 engages a worm wheel 64, Fig. 7, rotatable on a shaft 65, the worm wheel being fixed with an outer driving member 66 of an over-running clutch device having an inner driven cam member 67 fixed on shaft 65, and having a plurality of driving rollers 68 intermediate between the outer and inner members 66, 67, and operative in the usual manner to drive shaft 65 from worm wheel 64 and member 66, except when the shaft is itself driven by other means at a rate faster than the rate of member 66. An annular member 69 has side projections 70 interposed as spacers between the rollers 68.

A rapid traverse train for table 1 is driven from the motor 7 exclusive of the main clutch 12. This train includes shaft 10, Fig. 7, the meshed gears 71, 72, shaft 73, meshed bevel gears 74, 75, and meshed gears 76, 77. Gear 77 is rotatably mounted on a sleeve 78 which in turn is rotatably mounted on shaft 65, sleeve 78 being normally driven at a relatively fast or rapid traverse rate through an overload device which includes mutually engaging friction discs 79 and a spring 80 continuously urging the discs into friction engagement, the alternate discs being keyed to the extended hub 81 of gear 77, and to sleeve 78. The shaft 65, which is normally driven at feed rate through the overrunning clutch as previously explained, may be alternatively driven at quick traverse rate from sleeve 78 through a clutch member 82 which is fixed on shaft 65 and provided with end teeth adapted for engagement by complementary clutch teeth 83 on the end of sleeve 78, the sleeve 78 being axially shiftable by the means of an annular spool 84 and a shifter fork 85, to engage or disengage the clutch teeth. When the sleeve 78 is in the position disengaging the clutch teeth the feed train drives shaft 65 through the overrunning clutch member 69 and when the sleeve 78 is in the other, or clutch-engaged, position the rapid traverse train drives the shaft 65.

Shaft 65 drives table 1 through a table train comprising a reverser generally denoted by the numeral 86, Fig. 7, which includes oppositely running gears 87, 88, respectively driven from a gear 89 through an intermediate gear 90, and from a gear 91 which meshes directly with the gear 88. The reverser 86 includes a clutch member 92 having teeth 93, 94 respectively at its opposite ends and adapted to engage complementary clutch teeth on the faces of the gears 87, 88. A gear 95 is fixed on clutch member 92 and is engaged by a shifter fork 96 for shifting the clutch member. Gear 95 drives a table screw 97 through a gear 98 fixed on a sleeve 99, which is slidably keyed with the screw, the screw being journaled to move with the table 1 in the usual manner and engaging a nut 100 fixed with bed 3. The reverser clutch member 92 may be engaged for either direction of table movement or shifted to an intermediate position to stop the table by means later described.

Figure 5:
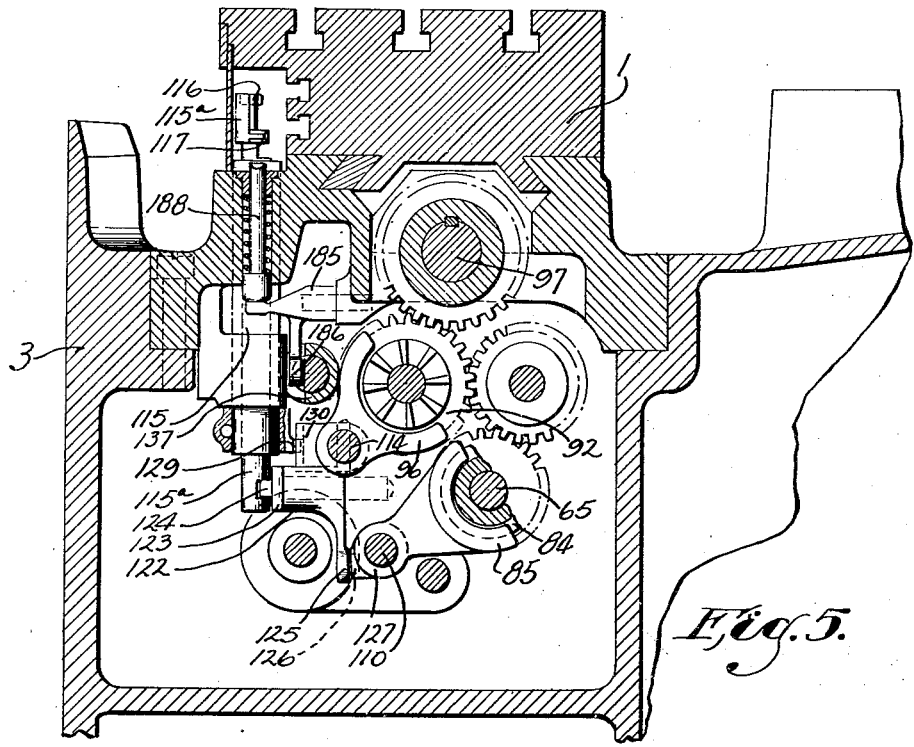
Figure 5 is a partial vertical section taken approximately along line 5—5 of Fig. 4.
Figure 6:
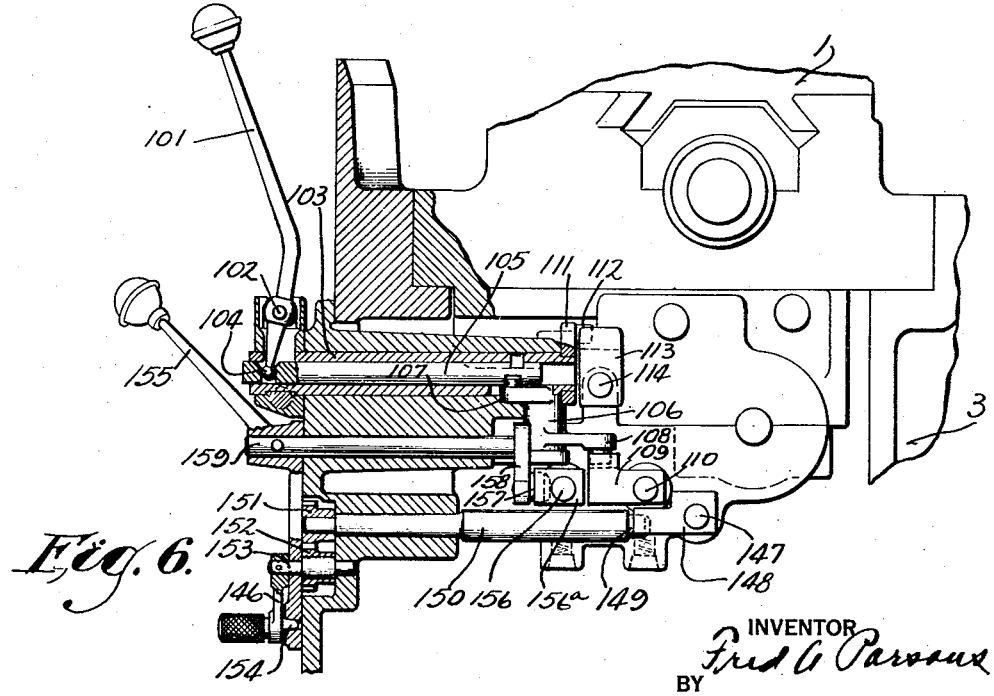
Figure 6 is a partial vertical section taken approximately along line 6—6 of Fig. 4.

For manual shifting of the feed and rapid traverse clutch fork 85, Fig. 7, and of the reverser clutch fork 96, Fig. 7, there is provided a hand lever 101, Figs. 1, 4, 6. Lever 101 is mounted for universal movement, either to right or left in Fig. 4, or in and out in Fig. 6, the lever oscillating about either of two pivots, one being a pivot pin 102, Fig. 6, and another being the axis of a rotatable sleeve 103, which carries the pivot pin 102. The in and out movement of lever 101 is connected for the movement of feed and quick traverse shifter fork 85 by the means of the lever end 104, a shifter rod 105, Fig. 6, axially movable in a bore in sleeve 103, a lever 106 having arms 107, 108, and a member 109 fixed on a shifter rod 110, upon which the shifter fork 85 is also fixed as shown in Fig. 5.

The right and left movement of lever 101 is connected for the movement of reverser shifter fork 96 by the means of pin 102 and lever end 104, Fig. 6, sleeve 103, a member 111 fixed on the end of the sleeve, a pin 112, and a member 113 engaged by pin 112 and fixed on a shifter rod 114, upon which the shifter fork 96 is also fixed as shown in Figs. 4, 5.

For dog operated shifting of the feed and rapid traverse clutch fork 85, and of the reverser clutch fork 96 there is provided a dog operable sleeve member 115, Figs. 4, 5 which may oscillate on a vertical axis and a control post 115a which is slidably keyed with the sleeve for vertical movement. Post 115a is provided with lugs or elements 116, 117 respectively at an upper and lower level and of a form and position to be operated upon by an upper line of dogs such as dog 118, Fig. 4, when the table 1 is moving to the right in Fig. 4, and by a lower line of dogs such as dog 119 when the table is moving to the left, such dogs, of suitable form, being used to shift the post up or down axially. Sleeve 115 is provided with dog abutment members 115b, 115c and other dogs, such as 120, 121, Fig. 4, respectively contact the abutments 115b, 115c during right and left hand table movements to turn the sleeve and post in opposite directions. The various dogs are provided with suitable angular contact surfaces to effect the described movement during the travel of the table.

The vertical movement of post 115a is connected to shift the feed and quick traverse shifter fork 85 by the means of a pivoted lever 122, Figs. 4, 5, having an arm 123 carrying a pin 124 engaging the lower end of post 115a, and an arm 125 carrying a pin 126, which engages a slot in a member 127, which may be the hub of feed and quick traverse shifter fork 85.

The oscillatory movement of sleeve 115 is connected to shift the reverser shifter fork 96 by the means of a segment member 129, Figs. 4, 5, fixed on sleeve 115 and having gear teeth engaging with suitable rack teeth on a member 130, which is fixed on the shifter rod 114 on which reverser shifter fork 96 is also fixed.

The various connections of the control post to the hand lever 101 and to the shifter forks 85, 96 is such that when the hand lever is moved to cause table travel to the right in Fig. 4, the resulting oscillation of post 115a turns the lug 117 to a position to be operated upon by the lower line of dogs such as 119, and turns the lug 116 out of dog contacting position, as indicated in Fig. 5. Similarly, table movement to the left brings lug 116 to position to be operated upon by the upper line of dogs such as 118, and turns lug 117 out of dog contacting position. Each direction of table movement may, therefore, be dog controlled without regard for the dogs controlling the other direction.

The dogs 120, 121 are used only for stopping the table, there being other means provided to effect automatic reversal, as will be later explained. These dogs are, therefore only of such height as will return sleeve 115 and post 115a to their central position of oscillation, which corresponds to the disengaged position of reverser clutch member 92. In this position neither of the lugs 116, 117 or abutments 115b, 115c project sufficiently to be contacted by any of the dogs, and the table can, therefore, be manually moved, as desired, by the means of a suitable crank, not shown, applied to the squared end 131, Fig. 4, of the feed screw 97. But the contact of abutments 115b or 115c with the one or the other of dogs 120, 121 after a table stop prevents manual operation of lever 101 for engaging reverser clutch member 92 in its previous direction, thereby preventing the operator, after a dog-effected stop, from inadvertently power traversing the table too far. The lever 101 can, however, be immediately operated to effect reverse movement because the stop dog does not interfere with further manual movement of the sleeve in the same direction of rotation to effect reversal.

The shifter fork 38 for main clutch 12 and brake 40; the shifter fork 85 for alternative feed and quick traverse; and the reverser shifter fork 96 may each be hydraulically operated, and are interconnected and interdependent to some extent and for certain purposes, as will now be described.

Figure 8:
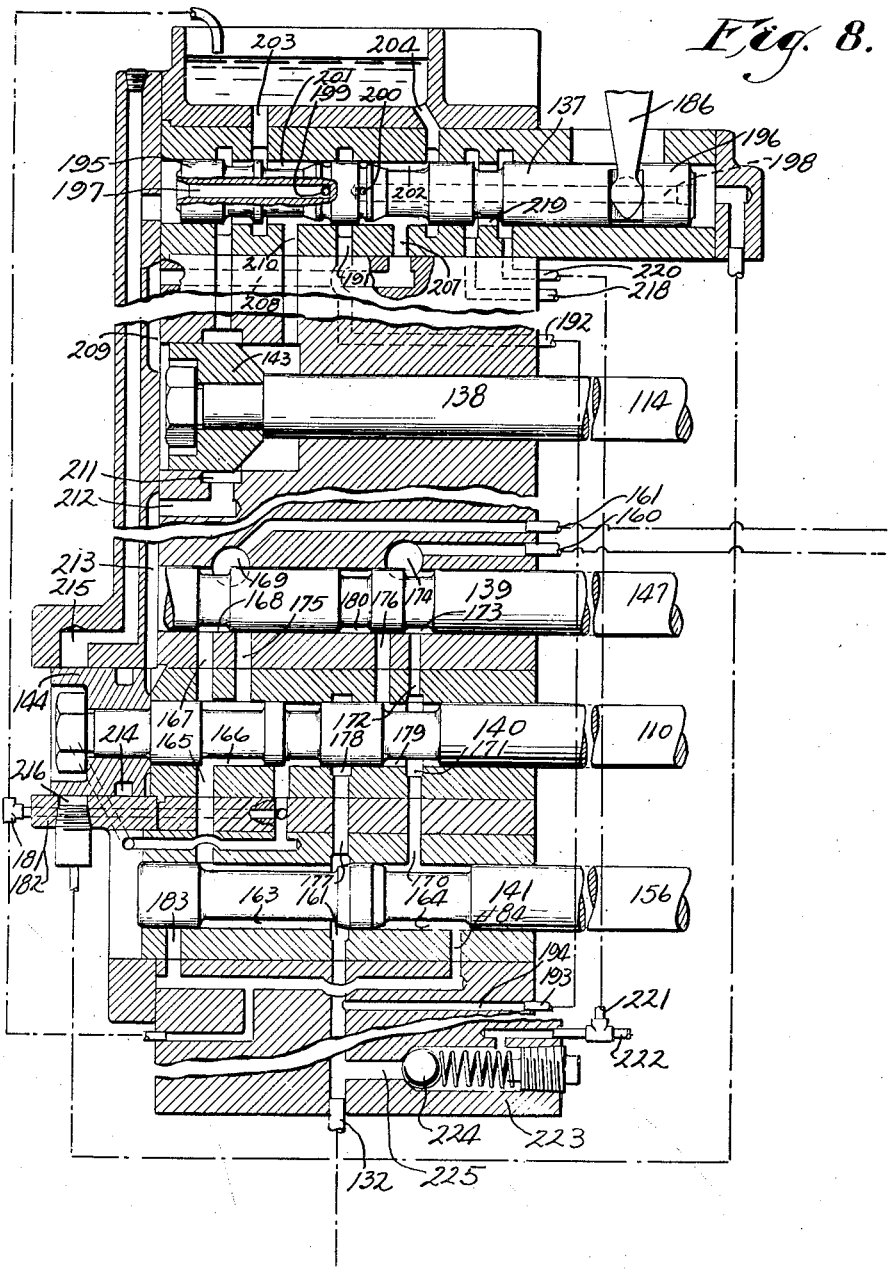
Figure 8 is a semi-diagrammatic development of certain of the control mechanism of the machine.

Fluid for operations just mentioned and for the lubrication of the machine, is continuously supplied to a channel 132, Fig. 8 from a suitable source of fluid pressure, such as a pump generally denoted by the numeral 133, Fig. 7. Pump 133 includes the impeller gears 134, 135 continuously driven through the gears 71, 72 and shaft 73, and draws fluid from a reservoir in the base 3, diagrammatically indicated at 136, Fig. 7. The fluid from channel 132 is delivered to various control devices through control valve mechanism including valves generally denoted by the numerals 137, 138, 139, 140, 141, Fig. 8, and 142, Fig. 7, the valves 138, 140, 142 being respectively associated for movement with the extended ends of the reverser shifter rod 114 Fig. 8 the feed and rapid traverse shifter rod 110, Fig. 8 and the main clutch shifter rod 39, Fig. 7. Also associated for movement with the several shifter rods are pistons 143, 144, 145 for shifting the respective rods in accordance with the supply of fluid thereto from the valves.

The main clutch 12 and brake 40 may be operated from the control valves either independently of the position of the feed and quick traverse clutch shifter rod 110, or alternatively in a manner such that whenever the quick traverse train is engaged to drive the table 1 then the main clutch 12 is disengaged, and brake 40 is operative, and whenever the feed train is engaged to drive the table 1 then the main clutch 12 is engaged. Selection of the one or the other action is effected by manually positioning the valve 139 to right or left in Fig. 8, by the means of a hand lever 146, Figs. 4, 6, the valve stem being extended to connect with a shifter rod 147, Figs. 6, 8, upon which is fixed a member 148 which is slotted to engage the eccentric end 149 of a shaft 150 which is connected by the gears 151, 152 to the shaft 153 upon which hand lever 146 is mounted, the lever being provided with a spring pressed detent plunger 154 to retain it in its different positions. When the valve 139 is in the position shown in Fig. 8 the control of the main clutch 12 is independent of the position of the feed and quick traverse clutch rod 110, and the control of main clutch 12 and brake 40 is then entirely dependent upon the position of valve 141, which may be shifted by the means of a hand lever 155, Figs. 4, 6, the valve stem being extended to provide a shifter rod 156, Figs. 6, 8, upon which is fixed a member 156a slotted to engage a pin 157 carried by a lever 158 fixed on the end of a shaft 159 upon which hand lever 155 is also fixed. In the position of valve 139 just mentioned, the fluid from channel 132 is supplied to the one or the other of the channels 160, 161, Fig. 8, which are respectively connected to the channels 160a, 161a, Fig. 7, whereby to shift piston 145 in the one or the other direction, the course of the fluid through the valves being as follows.

Port 162 of valve 141 may supply fluid to either annular valve groove 163, 164 according to the position of valve 141 as determined by hand lever 155. In the position of valve 141 shown in Fig. 8 the fluid passes to the channel 161 through channels and grooves 163, 165, 166, 167, 168, 169. In the other position of valve 141, to the left of its position in Fig. 8, the fluid passes to channel 160 through channels and grooves 164, 170, 171, 172, 173, 174.

The arrangement is such that if valve 139 is in the position shown in Fig. 8, the connections just described are obtained in either position of the feed and quick traverse shifter rod 110 and valve 140. But if the valve 139 is in its other position, to the right in Fig. 8 the action is different. In such case the fluid can reach channels 160 and 161 only through other channels 175, 176. Channels 175, 176 are so related to the grooves of valve 140 that when the feed and quick traverse shifter rod 110 is in the position shown in Fig. 9, which is the feed position, then, if valve 139 is in the position just stated, fluid may pass to the channel 161 through the grooves and channels 165, 166, 175, 168, 169, whereby to engage main clutch 12, but if the shifter rod 110 and valve 140 is in its other, or quick traverse position, to the left of the position shown in Fig. 8, then fluid will pass instead to the channel 160 through the grooves and channels 162, 177, 178, 179, 176, 180, 174, whereby to disengage the clutch 12 and engage brake 40.

It will be noted that the clutch disengaging effect just mentioned is not dependent upon the position of valve 141 and lever 155, since the fluid passes around the valve 141 through the exterior groove 162. On the contrary, the clutch engaging effect just mentioned may occur only when the valve 141 is in the position shown in Fig. 8, and then only if the valve 140 is in feed position. The result of the arrangement is that, when the valve 139 is in its automatic spindle stop position, to the right of the position shown in Fig. 8, a change from feed to quick traverse drive for the table will stop rotation of the tool spindle 2 irrespective of the position of hand lever 155 and valve 141, but the shifting of the feed and quick traverse shifter rod 110 and valve 140 to feed position will not start rotation of spindle 2 unless the hand lever 155 and valve 141 is in clutch engaged position. But since the feed train as well as the spindle train is derived through the clutch 12, as previously described, the table cannot move at a feed rate until the lever 155 and valve 141 is shifted to engage clutch 12 and start spindle 2, even though the shifter rod 110 and valve 140 is positioned to engage the feed train at its table end.

In each of the connections just described of the channel 132 to the clutch shifter channels 160 or 161 the other channel is connected to a drain pipe 181 through the one or the other of drain channels 182, 183, 184, whereby to permit the clutch piston 145 to shift, but since these drain connections may be readily perceived in Fig. 8, the various interconnecting channels will not be recited in detail.

The table reverser shifter rod 114 may be hydraulically shifted from the one to the other position of engagement of reverser 86 through the intermediate disengaged position, but only when the valve 137 is properly positioned for this purpose. Hydraulic shifting is not necessary or desirable for manual control of the reverser 86 from lever 101, being required only for automatic reversal of the table 1 at the end of a table stroke. Valve 137 has three positions, namely, the normal or central position, as shown in Fig. 8, a position to the right in Fig. 8, which will effect reversal from right hand to left hand table movement as later described, and a position to the left in Fig. 8, which will effect reversal from left hand to right hand table movement. Valve 137 is normally retained in its central position by the means of a pivoted lever 185, Fig. 4 having an arm 186, Figs. 4, 8 engaging a suitable slot in the stem of valve 137, and retained in central position by a pair of spring plungers 187, 188 acting on other arms 189, 190 of the lever 185 as shown in Fig. 4. In this central position of valve 137 a fluid channel 191, Fig. 8 which communicates with supply channel 132 through channels, 192, 193, 194, is cut off by the valve body.

The ends 195, 196 of valve 137, Fig. 8, are enclosed to operate as pistons respectively receiving fluid through axial channels 197, 198 and the transverse channels 199, 200 but only when the valve 137 has been shifted out of central position sufficiently to bring one of the valve grooves 201 or 202 into communication with the channel 191, the other of the grooves then communicating with one of the drain channels 203 or 204 to permit the valve 137 to be shifted. An initial movement of valve 137, sufficient to admit fluid from channel 191 to one end of the valve through channel 197 or 198, is effected by the one or the other of table dogs 205 or 206, Fig. 4 operating on the exposed upper ends of the spring plungers 187, 188, the arrangement being such that in either direction of table travel the movement of valve 137 thus originated by the dog will be in a direction to effect reversal to the other direction, as follows:

As soon as the pressure fluid is admitted to the one or the other valve end 195 or 196, the valve 137 is instantly shifted by fluid pressure, which then overcomes the springs operating on plungers 187, 188, Fig. 4, and as the valve 137 moves the channel 191 is connected by the valve ports to the one end or the other of reverser piston 143. Thus the movement of valve 137 to the left in Fig. 8 supplies fluid to the left end of reverser piston 143 through the grooves and channels 191, 202, 207, 208, 209; and movement of valve 137 to the right in Fig. 8 supplies fluid to the right end of reverser piston 143 through the grooves and channels 191, 201, 210. In each instance the other end of the piston 143 is connected to the one or the other of the drain channels 203 or 204, through channels which will be apparent in Fig. 8, and therefore will not be described.

When an automatic reversal of table movement is effected, as just described, it is desirable, in order to save time and for other reasons, that the table shall start its reverse movement at rapid traverse rate, irrespective of whether the forward movement was at feed or rapid traverse rate. In many instances the cutter is still cutting up to the instant when reversal takes place, and since a rapid traverse while the cutter is in contact with the work might damage the work or cutters it is necessary that any change from forward feed rate to quick traverse rate at the time of reversal should not take place until after forward movement has ceased.

In order to insure that the automatic reverse, irrespective of forward rate, always starts reverse movement at quick traverse rate, the feed and quick traverse shifter rod 110 is connected for movement with the piston 144, Fig. 8 and fluid is supplied to the right hand end, Fig. 8 of this piston to force the rod 110 to quick traverse position each time the valve 137 and reverser piston 144 are operated to effect automatic reversal from either direction of table movement. The supply of fluid for shifting piston 144 is derived from the reverser piston 143, which, after piston 143 has substantially completed its movement for reversal, opens the pressure supply channel 209 or 210, as the case may be, through the cylinder of piston 143 to a groove or channel 211, which communicates with the right hand end Fig. 8, of piston 144 through the channels 212, 213. The result is that, irrespective of the direction of movement of reverser piston 143, and irrespective of the position of feed and quick traverse piston 144 before reversal, the completion of reverse movement always finds the piston 144 in quick traverse position, but the arrangement insures that the change in rate shall not take place during forward movement.

Immediately after automatic reversal is fully effected, as described, including the change from feed to quick traverse rate in instances where the forward movement was at feed rate, the valve 137 is automatically returned to central position. This is effected as follows: When the piston 144 has been shifted to quick traverse position at the completion of automatic reversal, as just described, then the two ends 195, 196 of valve 137 are interconnected to relieve the unbalanced hydraulic pressure previously operating to force valve 137 out of central position. Such interconnection then exists through a channel groove 214, Fig. 8, in the piston 144, which then connects together the ends of two channels 215, 216, respectively connecting with the opposite ends 195, 196 of the valve 137. Immediately following such interconnection and consequent relief of unbalanced hydraulic pressure on valve 137 the spring plungers 187, 188, Fig. 4, return valve 137 to intermediate position as previously described.

It may be noted that if piston 144 and rod 110 are already in quick traverse position at the time reverse movement starts, then the valve 137 will not be shifted by hydraulic fluid as above described, because the ends of the valve will already be interconnected through the channels 214, 215, 216 whereby no unbalanced hydraulic pressure can be applied to shift the valve. In such case, however, the table 1 and dog 205, or 206, Fig. 4, will be moving at quick traverse rate and the dogs, operating through the plungers 187 or 188 will shift valve 137 to effect reversal substantially as quickly as if the valve 137 were moved hydraulically. Such reversal is not as accurate as that effected in the manner previously described, but extreme accuracy in reversal is not important when the forward movement is at quick traverse rate.

When valve 133 is in central position the various channels leading to the ends of valve 137, to piston 143, and to piston 144 are all connected to the one or the other of the drain pipes 203, 204, leaving the pistons free to be shifted by the manual controls previously described. These connections to the drains are apparent in Fig. 8 and therefore will not be described in detail.

In the machine as here shown the same pump 133 is used to supply fluid both for shifting and for lubrication. It is however preferable that the pressure available for shifting should be high relative to the lubricating pressure. Means are therefor provided to effect a high pressure, but only during shifting, thereby avoiding power waste and heating, as follows:

The shifter piston 145, Fig. 7, always stands in the one or the other position corresponding to an engaged clutch 12 or engaged brake 40, and from the previous description it will be apparent that the one or the other of the channels 160a, 161a leading to piston 145 is always open to receive fluid from channel 132, Fig. 8, through the channels and grooves leading through the valves 139, 140, 141. After the piston 145 has moved in accordance with the position of the valves, then a channel 217, Fig. 7 is opened to receive fluid from the one or the other channel 160a or 161a. The fluid from channel 132, Fig. 8 may therefore pass freely to channel 217 except during a brief interval when the piston 145 is shifting from one end of its stroke to the other. Channel 217 is permanently connected by suitable piping with a channel 218, Fig. 8, which in the normal or central position of valve 137 is by-passed through a valve groove 219 to a channel 220 connected by piping to a channel 221 which joins another channel 222 leading to any suitable system of lubrication. Thus in the normal central position of valve 137 the fluid supply from channel 132, Fig. 8, has free access to the lubricating supply line 222, except momentarily when the piston 145 is being shifted.

But if the valve 137 is shifted from central position slightly in either direction, as by the dog action previously described, then the by-pass through the valve channel 219 will be temporarily cut off, and relatively high pressure fluid is then available from channel 132 through the channels 194, 193, 192, 191 for effecting the hydraulic reverse, and other control movements previously described.

A relief valve 223, Fig. 8, consisting of a spring pressed ball 224, provides an outlet for relief of fluid through a channel 225 to channel 222 if the other outlet through channel 194 is momentarily blocked for any reason.

It is, of course, apparent that the release of pressure through valve 137 as just described, does not affect the pressure available at all times for the shifting of the clutch and brake piston 145, and that for this piston the pressure is increased only during the actual shifting of the piston, which is an extremely brief interval.

It will be noted that the automatic reverse mechanism previously described avoids any necessity for snap-over detents and lost motion shifting devices for the reverser 86. Also that in the shifting of the clutch 83 to effect a change from feed rate to quick traverse rate or vice versa, by reason of the over-running nature of the connection of the quick traverse train, there is no need for any detent or lost motion devices to throw the clutch mechanism across an intermediate disengaged position, for no such position exists. If the quick traverse train is not engaged then the feed train takes up the driving motion through the over-running clutch device. But it is desirable to provide spring means for engagement of the clutch 83 for dog shifting from feed to quick traverse rate, for the reason that a positive dog shift might break some of the mechanism leading from the table dog to the clutch if it should occur that the complementary clutch teeth abutted at their ends to oppose engagement. Moreover, the clutch 83 should shift quickly past any position of slight engagement where the unit pressure on the clutch faces would be too high. To effect both these results the shifter rod 110 is provided with a conical cam 226, Fig. 4, cooperating with a pair of pivoted spring urged elements 227, 228 arranged for the points of the elements to pass over the points of the cam prior to engagement of clutch 83, whereby to quickly shift the rod 110 and clutch 83 into engaged position and through the position of slight clutch engagement.

It will, of course, be clear that any of the described modes of operation of the feed and quick traverse shifter rod 110, either simultaneously with the automatic reversal, or by the dogs 118, 119 unaccompanied by automatic reversal, or manually by the lever 101, will have the same effect so far as concerns the operation of the clutch 12 and brake 40. If the control valve 139 is in automatic spindle stop position the shifting of rod 110 to feed position, by whatever means, will engage the clutch 12, and the shifting of rod 110 to quick traverse position will disengage the clutch 12 and engage the brake 40. And if the control valve 139 is in its other position shifting of the rod 110 will have no effect on the clutch and brake.

What is claimed is:

1. In a machine tool, the combination of a tool support and a work support, a transmission for relative movement of said supports including a feed rate train, a quick traverse rate train, a shiftable reverser operative to change the direction of said relative movement, and a selector shiftable to effect said relative movement alternatively through the one or the other of said trains; and control means for said transmission including a first controller operable for selection of the one or the other direction independently of a change in said rates, a second controller operable for selection of one or the other rates independently of change in direction, other control means operative for substantially simultaneously effecting a change in direction and a change in rate, and means limiting the operation of said other controller to effect the changes in the order recited.

2. In a milling machine the combination of a rotatable tool spindle, a work support reciprocable in a direction transverse to the axis of said spindle, transmission mechanism for rotation of said spindle, a transmission for movement of said work support including a feed rate changer and means shiftable for support actuation at the feed rate determined by said rate changer or at an alternative quick traverse rate changer or at an alternative quick traverse rate and for support movement in alternative directions; and control mechanism for said transmission including a plurality of controllers each independently operable and respectively for selection of said directions and for selection of said rates, and other control means operative for substantially simultaneously changing both said direction and rate and limited to operation in the order recited.

3. In a machine tool, the combination of a tool support and a work support, a transmission for relative movement of said supports including means shiftable for alternative actuation at a feed rate or at a relatively fast quick traverse rate and for alternative directions of said relative movement; and control mechanism for said transmission including a first manually operable controller for selection of said direction independently of change in rate, a second controller manually operable for selection of said rates independently of a change in direction, and a dog controlled means for substantially simultaneous change of both direction and rate and limited to to operation in the order recited.

4. In a milling machine the combination of a rotatable tool spindle, a work support reciprocable in a direction transverse to the axis of said spindle, transmission mechanism for rotation of said spindle, a transmission for movement of said work support including a feed rate train, a quick traverse rate train, a shiftable reverser for effecting alternative support directions, and a selector shiftable for alternative actuation of said support through the one or the other of said trains; and control mechanism for said transmission including a plurality of independently manually operable controllers respectively for selection of said alternative support directions and for selection of the one or the other of said rates, and dog operable means for the substantially simultaneous change of both direction and rate and limited to operation in the order recited.

5. In a machine tool, the combination of a tool support and a work support, a transmission for relative movement of said supports including a feed rate train, a quick traverse rate train, and means shiftable to effect said relative movement in alternative directions and alternatively from the one or the other of said trains; and control mechanism for said transmission including a first manually operable controller for effecting a change in said directions independently of a change in said rates, a second controller manually operable for effecting a change from one to the other of said rates independently of change in direction and a dog controlled means operative to shift said shiftable means to effect a change in direction of support actuation, and means operative only upon operation of said dog controlled means to urge said shiftable means in the direction effecting said relative movement from said quick traverse train.

6. In a milling machine the combination of a rotatable tool spindle, a work support reciprocable in a direction transverse to the axis of said spindle, transmission mechanism for rotation of said spindle, a transmission for movement of said work support including a feed rate train, a quick traverse rate train, and means shiftable to effect said relative movement in either direction and alternatively through the one or the other of said trains; and control mechanism for said transmission including a plurality of manually operable controllers respectively for a change in said direction independently of a change in rate, and for a change in rate independently of a change in direction, a dog controlled means operative to shift said shiftable means to effect a change in direction of support actuation, and means invariably operative upon operation of said dog controlled means to urge said shiftable means in the direction effecting movement of said support through said quick traverse train.

7. In a machine tool, the combination of a tool support and a work support, a transmission for relative movement of said supports including a feed rate train, a quick traverse rate train, and means shiftable for alternative directions of said relative movement and for alternative actuation through the one or the other of said trains; and control mechanism for said transmission including a first manually operable controller for selection of the one or the other direction independently of a change in rate, a second controller manually operable for selection of said trains independently of a change in direction, and a dog operable means controlled to shift said shiftable means out of either direction position to the other direction position, and operative in either resulting direction position invariably to urge said shiftable means toward a position effecting said relative movement from said quick traverse train.

8. In a milling machine the combination of a rotatable tool spindle, a work support reciprocable in a direction transverse to the axis of said spindle, transmission mechanism for rotation of said spindle, a transmission for movement of said work support including a feed rate train, a quick traverse rate train, a shiftable reverser, and a selector shiftable for alternative actuation of said support through the one or the other of said trains; and control mechanism for said transmission including a plurality of independently manually operable controllers respectively for the operation of said reverser and of said selector, and dog controlled means operative for the substantially simultaneous operation of said selector and reverser including means operable to shift said reverser out of either direction position thereof to the other direction position and operative in either direction of shifting of said reverser to urge said selector in the direction to effect movement of said support from said quick traverse train.

9. In a machine tool, the combination of a tool support and a work support, a transmission for relative movement of said supports including a feed rate train, a quick traverse rate train, a shiftable reverser operative to change the direction of said relative movement, and a selector shiftable to effect said relative movement alternatively from the one or the other of said trains; and control mechanism for said transmission including a first manually operable controller for operation of said reverser independently of said selector, a second manually operable controller independently operable for operation of said selector, other control means including dog controlled means for substantially simultaneous operation of said selector and said reverser, and still other control means including dog operable means for independently shifting said reverser and selector.

10. In a machine tool, the combination of a tool support and a work support, a transmission for relative movement of said supports including a feed rate train, a quick traverse rate train, a shiftable reverser operative to change the direction of said relative movement, and a selector shiftable to effect said relative movement alternatively from the one or the other of said trains; and control mechanism for said transmission including a first manually operable controller for operation of said reverser, a second manually operable controller for operation of said selector, said first and second controllers being selectively manually operable for independent or for simultaneous operation, and a third controller including dog controlled means invariably effective both for operation of said reverser and for substantially simultaneously urging said selector in a direction effecting said relative movement from said quick traverse train.

11. In a machine tool, the combination of a tool support and a work support, a transmission for relative movement of said supports including a feed rate train, a quick traverse rate train, a shiftable reverser operative to change the direction of said relative movement, and a selector shiftable to effect said relative movement alternatively from the one or the other of said trains, a first controller for shifting said reverser, a second controller for shifting said selector, each of said controllers including both manually operable and dog operable elements adapted for independent operation of the different controllers, another controller including a dog operable element adapted upon actuation to effect shifting of said reverser from the one to the other direction position thereof, and means controlled by the operation of the last mentioned controller to urge said selector in the direction effecting said relative movement from said quick traverse train.

12. In a machine tool, the combination of a tool support and a work support, a transmission for relative movement of said supports either of opposite directions including a feed rate train, a quick traverse rate train, a shiftable reverser having positions respectively effective for opposite support movement and a motion interrupting position, a selector shiftable for effecting said support movement alternatively from the one or the other of said trains, a shifter for selectively positioning and retaining said reverser in any of said positions, an independently operable shifter for positioning said selector, a power train connectible for the operation of said reverser through said motion interruption position, a controller shiftable for interrupting or establishing the connection of said power train, means normally continuously urging said controller to train interrupting position and means for shifting said controller to train connecting position at the end of relative support movement in one of said directions.

13. In a machine tool, the combination of a tool support and a work support, a transmission for relative movement of said supports including a feed rate train, a quick traverse rate train, a shiftable reverser having positions respectively effective for opposite support movement and a motion interrupting position, a selector shiftable for effecting said support movement alternatively from the one or the other of said trains, a shifter for selectively positioning and retaining said reverser in any of said positions, an independently operable shifter for positioning said selector, a power train connectible for the operation of said reverser through said motion interrupting position and shifting of said selector shifter in a direction effecting support movement from said quick traverse train, control means shiftable for interrupting or establishing the connection of said power train, means normally continuously urging said control means to the position interrupting said train connection, means for shifting said control means to the position establishing the connection of said power train, and means limiting the connection of said power means to said selector shifter to be effected subsequently to the movement of said reverser through said motion interrupting position.

14. In a milling machine the combination of a rotatable spindle, a work support reciprocable in a path transverse to the axis of said spindle, power mechanism for rotation of said spindle, a transmission for movement of said work support including reverser means shiftable to opposite direction positions and to a motion interrupting position, and selector means shiftable for alternative actuation of said support at a feed rate or at a relatively fast quick traverse rate, a first and second shifter each independently operable and respectively for shifting said reverser means and selector means, a power train connectible for shifting said reverser means from the one to the other of said direction positions, dogs movable in accordance with the movement of said work support and operable to shift said first and second shifters, control means shiftable for connecting and disconnecting said train, means normally continuously urging said control means to disconnect said power train, and another dog movable in accordance with support movement and operative to shift said control means to connect said power train at the end of a unidirectional support movement.

15. In a machine tool, the combination of a plurality of relatively movable supports and transmission and control mechanism for said relative movement including shiftable reversing and interrupting mechanism and a selector shiftable to effect alternative operation at a feed rate or a relatively fast quick traverse rate, a plurality of independently operable controllers respectively for operating said reversing and interrupting mechanism and for operating said selector, said controllers each including a plurality of elements respectively manually operable and dog-operable, and other control means including power means operable for substantially simultaneously reversing and changing the rate of said transmission, said other control means being normally inoperative and including a dog-operable element controlling operation thereof.

16. In a machine tool, the combination of a plurality of relatively movable supports and transmission and control mechanism for said relative movement including reversing and interrupting mechanism and a selector shiftable to effect alternative operation at a feed rate or a relatively fast quick traverse rate, a plurality of independently operable controllers respectively for operating said reversing and interrupting mechanism and for shifting said selector, said controllers each including a plurality of elements respectively manually operable and dog-operable, other control means including power means operable for substantially simultaneously reversing and changing the rate of said transmission, and means controlling operation of said other control means including a dog-operable element for connecting said power means, and means limiting the operation thereof to reversal and rate change in the order recited.

17. In a milling machine having a rotatable spindle and a work support reciprocable in a path transverse to the axis of said spindle the combination of transmission mechanism for rotation of said spindle and actuation of said support including support reversing and interrupting means and a selector shiftable for alternative actuation of said support at a feed rate or at a relatively fast quick traverse rate, a plurality of independently operable controllers respectively for operation of said reversing and interrupting means and for shifting said selector, said controllers each including a plurality of elements respectively manually operable and dog operable, and other control means including power means operable for substantially simultaneously reversing and changing the rate of said transmission.

18. In a milling machine having a rotatable spindle and a work support reciprocable in a path transverse to the axis of said spindle, the combination of transmission mechanism for rotation of said spindle and actuation of said support including support reversing and interrupting means and means for alternative actuation of said support at a feed rate or at a relatively fast quick traverse rate, a plurality of independently operable controllers respectively for operation of said reversing and interrupting means and for effecting a change from the one to the other of said rates, said controllers each including a plurality of elements respectively manually operable and dog operable, other control means including power means operable for substantially simultaneously reversing and changing the rate of said transmission, dog operable means controlling the operation of said power means, and means limiting the operation of said other control means to effect reversal and rate change in the order recited.

19. In a milling machine having a rotatable spindle and a work support reciprocable in a path transverse to the axis of said spindle, the combination of transmission mechanism for rotation of said spindle and actuation of said support including support reversing and interrupting means and means for alternative actuation of said support at a feed rate or at a relatively fast quick traverse rate, a plurality of independently operable controllers respectively for operation of said reversing interrupting means and for effecting a change from the one to the other of said rates, said controller each including a plurality of elements respectively manually operable and dog operable, other control means including dog controlled power means for effecting reversal and rate change, and means limiting the operation of said other control means to effect reversal followed by a quick traverse rate substantially simultaneously in the order recited.

20. In a machine tool the combination of a plurality of relatively movable supports and transmission and control mechanism for support movement including reversing and interrupting mechanism and mechanism for alternative operation at a feed rate or a relatively fast quick traverse rate, a plurality of independently operable controllers respectively for operating said reversing and interrupting mechanism and for effecting a change from the one to the other of said rates, said controllers each including a plurality of elements respectively manually operable and dog operable, and other control means including power means for effecting reversal of said mechanism, said other control means being normally inoperative and including a dog operable element controlling operation thereof.

21. In a milling machine having a rotatable spindle and a work support reciprocable in a path transverse to the axis of said spindle, the combination of transmission mechanism for rotation of said spindle and actuation of said support including support reversing and interrupting means and means for alternative actuation of said support at a feed rate or at a relatively fast quick traverse rate, a plurality of independently operable controllers respectively for operation of said reversing and interrupting means and for effecting a change from the one to the other of said rates, said controllers each including a plurality of elements respectively manually operable and dog operable, and other control means including power means for effecting reversal of said support, said other control means being normally inoperative and including a dog operable element controlling operation thereof.

22. In a milling machine having a rotatable spindle and a work support reciprocable in a path transverse to the axis of said spindle the combination of a spindle transmission including means shiftable for alternatively establishing or interrupting spindle rotation, a support transmission including reversing and interrupting means and means for alternatively effecting a feed rate or a relatively fast quick traverse rate, control means for selectively reversing or interrupting or independently changing the rate of said support and other control means for substantially simultaneously reversing said support, changing the rate thereof and shifting said shiftable means, said other control means including means limiting said reversal to take place prior to the other effects mentioned.

23. In a milling machine having a rotatable spindle and a work support reciprocable in a path transverse to the axis of said spindle, the combination of a spindle transmission including means shiftable for alternatively establishing or interrupting spindle rotation, a support transmission including reversing and interrupting means and means for alternatively effecting a feed rate or a relatively fast quick traverse rate, a plurality of independently operable controllers respectively for effecting alternative reversal or interruption of said support and for effecting different of said rates, and other control means for substantially simultaneously reversing said support, changing the rate thereof and shifting said shiftable means, said other control means including means limiting said reversal to take place prior to the other effects mentioned.

24. In a milling machine having a rotatable spindle and a work support reciprocable in a path transverse to the axis of said spindle the combination of a spindle transmission including means shiftable for alternatively establishing or interrupting spindle rotation, a support transmission including reversing and interrupting means and means for alternatively effecting a feed rate or a relatively fast quick traverse rate, a plurality of independently operable controllers respectively for effecting alternative reversal or interruption of said support and for effecting different of said rates, and other control means for substantially simultaneously reversing said support, changing the rate thereof and shifting said shiftable means and including means limiting the order thereof to the order recited.

25. In a milling machine having a rotatable spindle and a work support reciprocable in a path transverse to the axis of said spindle the combination of a spindle transmission including means shiftable for alternatively establishing or interrupting spindle rotation, a support transmission including reversing and interrupting means and means for alternatively effecting a feed rate or a relatively fast quick traverse rate, a plurality of independently operable controllers respectively for effecting alternative reversal or interruption of said support and for effecting different of said rates, and other control means for substantially simultaneously reversing said support, changing the rate thereof and shifting said shiftable means and including means limiting said reversal and shifting to the order recited.

26. In a milling machine having a rotatable spindle and a work support reciprocable in a path transverse to the axis of said spindle, the combination of a spindle transmission including means shiftable for alternatively establishing or interrupting spindle rotation, a support transmission including reversing and interrupting means and means for alternatively effecting a feed rate or a relatively fast quick traverse rate, a plurality of independently operable controllers respectively for effecting alternative reversal or interruption of said support and for effecting different of said rates, said controllers each including a dog operable element and a manually operable element, and other control means for substantially simultaneously reversing said support, changing the rate thereof and shifting said shiftable means and including means limiting the order thereof to the order recited, said other control means being normally inoperative, and a dog movable in accordance with movement of said support to effect operation of said other control means.

27. In a milling machine having a rotatable spindle and a work support reciprocable in a path transverse to the axis of said spindle, the combination of a spindle transmission including means shiftable for alternatively establishing or interrupting spindle rotation, a support transmission including reversing and interrupting means and means for alternatively effecting a feed rate or a relatively fast quick traverse rate, a plurality of independently operable controllers respectively for effecting alternative reversal or interruption of said support and for independently effecting different of said rates, and other control means including power means for substantially simultaneously reversing said support, changing the rate thereof and shifting said shiftable means said other control means including means limiting said reversal to take place prior to the other effects mentioned.

28. In a milling machine having a rotatable spindle and a work support reciprocable in a path transverse to the axis of said spindle, the combination of a spindle transmission including means shiftable for alternatively establishing or interrupting spindle rotation, a support transmission including reversing and interrupting means and means for alternatively effecting a feed rate or a relatively fast quick traverse rate, a plurality of independently operable controllers respectively for effecting alternative reversal or interruption of said support and for effecting different of said rates, said controllers each including a dog operable element and a manually operable element, other control means including power operable means for substantially simultaneously reversing said support, changing the rate thereof and shifting said shiftable means, and a power train connectible for operation of said other control means, said other control means including a dog operable element shiftable for connection of said power train and a dog movable in accordance with the movement of said support for shifting the element last mentioned.

29. In a milling machine having a rotatable spindle and a work support reciprocable in a path transverse to the axis of said spindle, the combination of a spindle transmission including means shiftable for alternatively establishing or interrupting spindle rotation, a support transmission including reversing and interrupting means and means for alternatively effecting a feed rate or a relatively fast quick traverse rate, a plurality of independently operable controllers respectively for effecting alternative reversal or interruption of said support and for effecting different of said rates, said controllers each including a dog operable element and a manually operable element, other control means including power operable means for substantially simultaneously reversing said support, changing the rate thereof and shifting said shiftable means, and a power train connectible for operation of said other control means, said other control means including a dog operable element shiftable for connection of said power train, a dog movable in accordance with movement of said support for shifting the element last mentioned, and means limiting the operation thereof to an order in which both said rate change and said shifting of said shiftable means takes place subsequent to said support reversal.

30. A milling machine as specified in claim 14, in which the power train includes a fluid pressure source and a fluid operable piston connectible for operation from said source and connected for operation of the reverser.

31. A machine tool as specified in claim 16 in which the power means includes power operated pump means and a plurality of piston devices each connectible for operation from said pump means and respectively connected for operation of the reversing mechanism and of the selector.

32. A milling machine as specified in claim 27 in which the power means includes power operated pump means and a plurality of piston devices each connectible for operation from said pump means and respectively connected for operation of the reverser, for effecting the rate change and for shifting the shiftable means.

33. A milling machine as specified in claim 27 in which the power means includes pump means driven from the spindle transmission to exclude the shiftable interrupting means, and a plurality of shiftable piston devices connectible for operation from said pump means.

34. In a machine tool the combination of a rotatable spindle, a reciprocatory support, transmission mechanism for said support movement including means shiftable for effecting support movement in alternative directions and alternatively at feed or quick traverse rates, a plurality of controllers respectively for shifting said shiftable means for effecting a change in direction independently of a change in rate, and for shifting said shiftable means for effecting a change in rate independently of a change in direction, another controller for shifting said shiftable means for substantially simultaneously effecting a change in both direction and rate, a manually operable element mounted for movement in a plurality of transverse paths, one of which is substantially parallel with the movement of said support, means connecting said element for movement in the last mentioned path to operate said independent direction controller and for movement in the other path to operate said independent rate controller, and a dog operable element controlling the operation of said other controller.

35. In a machine tool, the combination of a tool support and a work support, a transmission for relative movement of said supports including a feed rate train, a quick traverse rate train, a shiftable reverser having positions respectively effective for opposite support movement and a motion interrupting position, and a selector shiftable for effecting said support movement alternatively from the one or the other of said trains, a shifter for selectively positioning and retaining said reverser in any of said positions, an independently operable shifter for selectively positioning said selector, a power train connectible for the operation of said reverser from one of said effective positions through said motion interrupting position, and means controlling the connection of said power train including a dog movable in accordance with said relative movement, said power train including a fluid pressure source and fluid operable shifting means connectible for operation from said source and connected to operate said reverser.

FRED A. PARSONS.